G. N. MUNGER.
Stop-Cock.

No. 204,162. Patented May 28, 1878.

WITNESSES:
J. S. West
Cornelius Cox

INVENTOR:
G. N. MUNGER,
BY
N. W. Beadle & Co
ATTYS

UNITED STATES PATENT OFFICE.

GEORGE N. MUNGER, OF NEW HAVEN, ASSIGNOR TO HIMSELF, ELIAS P. MERRIMAN, EDWIN M. MUNGER, OF SAME PLACE, AND GEORGE MUNGER AND GEORGE B. MUNGER, OF MADISON, CONNECTICUT.

IMPROVEMENT IN STOP-COCKS.

Specification forming part of Letters Patent No. 204,162, dated May 28, 1878; application filed February 28, 1878.

*To all whom it may concern:*

Be it known that I, GEORGE N. MUNGER, of New Haven, in the county of New Haven and State of Connecticut, have invented a new and useful Improvement in Stop-Cocks; and I do hereby declare the following is a full and exact description of the same, reference being had to the accompanying drawings, and to the letters of reference marked thereon.

This invention, which I term "Munger's Universal Stop-Cock," consists in certain peculiarities of construction, fully described hereinafter, by means of which simplicity of parts is obtained, with marked advantages of operation and great durability, as will be fully described hereinafter.

Figure 1:
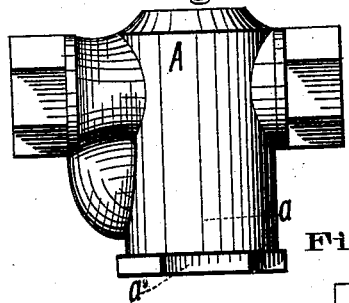
Figure 2:
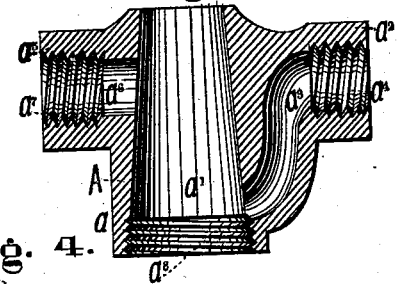
Figures 3, 4:
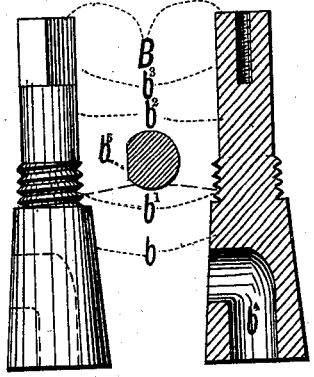
Figure 5:
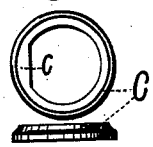
Figure 6:
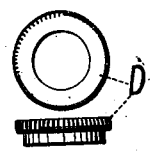
Figure 7:
Figure 8:
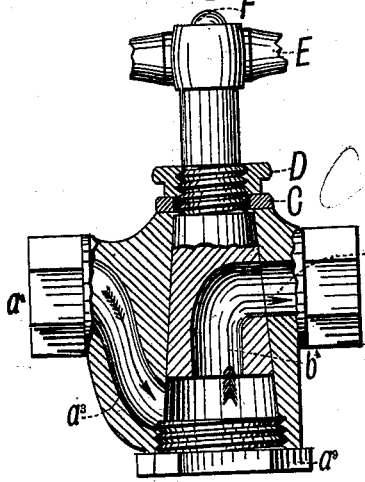
Figure 9:
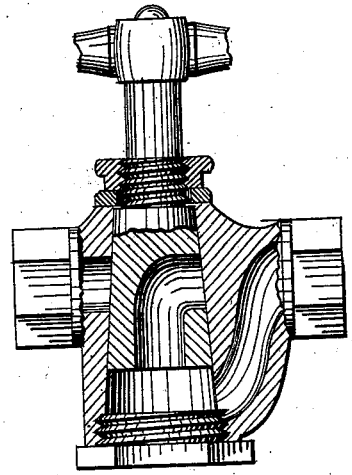
Figure 10:
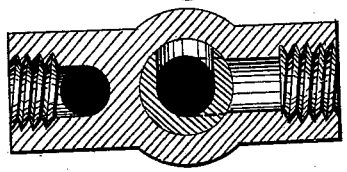

In the drawings, Figure 1 represents a side elevation of the body or shell of the cock; Fig. 2, a sectional elevation of the same; Figs. 3 and 4, side and sectional elevations of the plug; Fig. 5, a side and plan view of the washer C; Fig. 6, a side and plan view of the collar D; Fig. 7, a side and plan view of the handle; Fig. 8, a vertical sectional elevation of the entire cock with the plug in position to permit the flow of water; Fig. 9, a similar view from the opposite side of the cock, with the plug in position to shut off the flow; and Fig. 10, a transverse longitudinal section, with the plug represented in its closed position by full lines and in its open position by dotted lines.

To enable others skilled in the art to make and use my improved stop-cock, I will now proceed to describe the same.

A, Fig. 1, represents the body or shell of the cock, consisting of a casting of suitable material, having the main cylindrical portion $a$ with interior conical recess or chamber $a^1$ Fig. 2, the side wing $a^2$ having the interior passage or water-way $a^3$, leading from the entrance-opening $a^4$ of the cock, by means of a proper bend or curve, to the lower part of the chamber $a^1$, as shown, and the opposite side wing $a^5$, having the water-way $a^6$ and discharge-opening $a^7$, as shown. $a^8$ represents an interior threaded portion at the lower end of the part $a$ of the shell, which is adapted, when the parts are in place, to hold the correspondingly-threaded portion of the cap $a^9$, as shown. The entrance-opening $a^4$ of the cock is threaded, as shown, in order that connection may be made with the main, and so, also, is the discharge-opening $a^7$, in order that connection may be made with the continuing pipe-section or discharge-nozzle.

B, Figs. 3 and 4, represents the plug, consisting of a conical block having the main portion $b$, the threaded cylindrical portion $b^1$, the shank or standard $b^2$, and the angular portion $b^3$, as shown. The main portion $b$ is provided with an exterior bearing-surface and an interior curved passage or water way, $b^4$, having an entrance-opening below and a discharge-opening above upon one side, as shown.

The threaded cylindrical portion $b^1$ is cut away in a vertical plane upon one side, as shown at $b^5$, for purposes hereinafter explained.

C represents a washer provided with a projecting portion, $c$, corresponding in size and shape with the cut-away place $b^5$ of the threaded portion $b^1$, by means of which it is adapted to surround the latter, when the same is properly in place, and bear upon the upper face of the shell, as shown. By means of the flat place on the plug and the corresponding projection on the washer, the two are so united that the movements of the former are positively communicated to the latter.

D, Fig. 6, represents a sleeve or collar having interior threads adapted to fit the threaded portion of the plug, as shown.

E, Fig. 7, represents a handle having a central angular socket adapted to fit the angular portion of the plug, as shown.

F, Fig. 8, represents a fastening-screw adapted to enter a proper socket in the end of the plug, as shown, by means of which the handle and plug are strongly united.

The relative positions of the parts when properly united are shown in Figs. 8 and 9.

The plug is inserted into the conical chamber of the shell through the opening below, and is held properly in place against its bearings by the washer C and collar D, as shown.

After the plug is placed in its proper position the cap $a^9$ may be screwed to place and the handle E be fixed to the top of the plug.

The operation will be readily understood.

When it is desired to permit the water to flow through the cock, the plug is turned into such position that its side discharge-opening will coincide and communicate with the discharge passage-way of the shell, as shown in Fig. 8. In this position the flowing stream will enter at the entrance-opening $a^4$, pass, as indicated by the arrows, through the water-way $a^3$ down into the open chamber of the shell, then up through the passage $b^4$ to the passage $a^6$ and discharge-opening $a^7$. When it is desired to shut off the water, the plug is turned into such position that its side discharge-opening does not coincide with or communicate with the discharge passage-way of the shell, but, on the contrary, opens against some solid portion of the wall, as shown in Fig. 9.

The water, it will be observed, is admitted to the cock below the plug, so that the tendency of the head or pressure is constantly to force the latter against its seat, and thus keep it tight under all circumstances. Even if the bearings become worn by constant use, no leakage will occur, because the wear will be compensated for by the upward movement of the plug under pressure.

The plug is properly held in place when not under pressure, and at other times also, by the washer C and collar D, the former of which bears upon the upper face of the shell, as shown. This washer, in consequence of its peculiar construction, is keyed to the plug in such manner as to revolve with it in all its movements, while at the same time it is capable of movement freely in a vertical direction.

The collar serves to fasten the washer to the plug and to control its movements in a vertical direction for the purpose of giving it its proper bearing on its seat. After the collar is properly adjusted, the three parts—*i. e.*, collar, washer, and plug—form practically a single structure, which is moved by the plug-handle as one piece.

Some of the advantages of the described construction are as follows: By means of the construction described, the water is admitted below the plug, and hence the pressure, instead of acting adversely on the cock, serves to keep it to its seat and make it tight without the use of packing. By means of this construction, also, the wear incidental to its use tends only to tighten the joint and prevent leakage.

The flow of water can be controlled with great facility, the handle being moved to entirely open or close this communication by a single quarter-revolution. The construction is such, also, that little or no injury can be effected by the presence of foreign matters in the water, the bearings being so closely united that the entrance of such substances between them is impossible.

The construction of the cock, as a whole, is very simple, and it is not liable to get out of order.

Having thus described my invention, what I claim as new, and desire to secure by Letters Patent, is—

1. In combination with the shell A, having the conical interior chamber inclining inward as it extends upward, the conical plug B, the parts being arranged to admit the water below for the purpose of keeping the plug to its seat.

2. In combination with the conical chamber, the conical plug extending through the top of the chamber, and the cap $a^9$ closing the lower opening, the construction being such that the cap may be removed without disturbing any other part, as described.

3. The cock described, having the shell A, with chamber $a^1$ and passages $a^3$ $a^6$, the plug B, with passage $b^4$, the cap $a^9$, washer C, and collar D, as described.

This specification signed and witnessed this 21st day of February, 1878.

GEORGE N. MUNGER.

Witnesses:
SAVILIAN R. HULL,
RALPH HULL,
GEO. M. ERHARDT.